C. LIGHTFOOT.
MEANS FOR REGULATING RATE OF FLOW THROUGH A PASSAGE.
APPLICATION FILED JAN. 9, 1911.
1,023,209.
Patented Apr. 16, 1912.
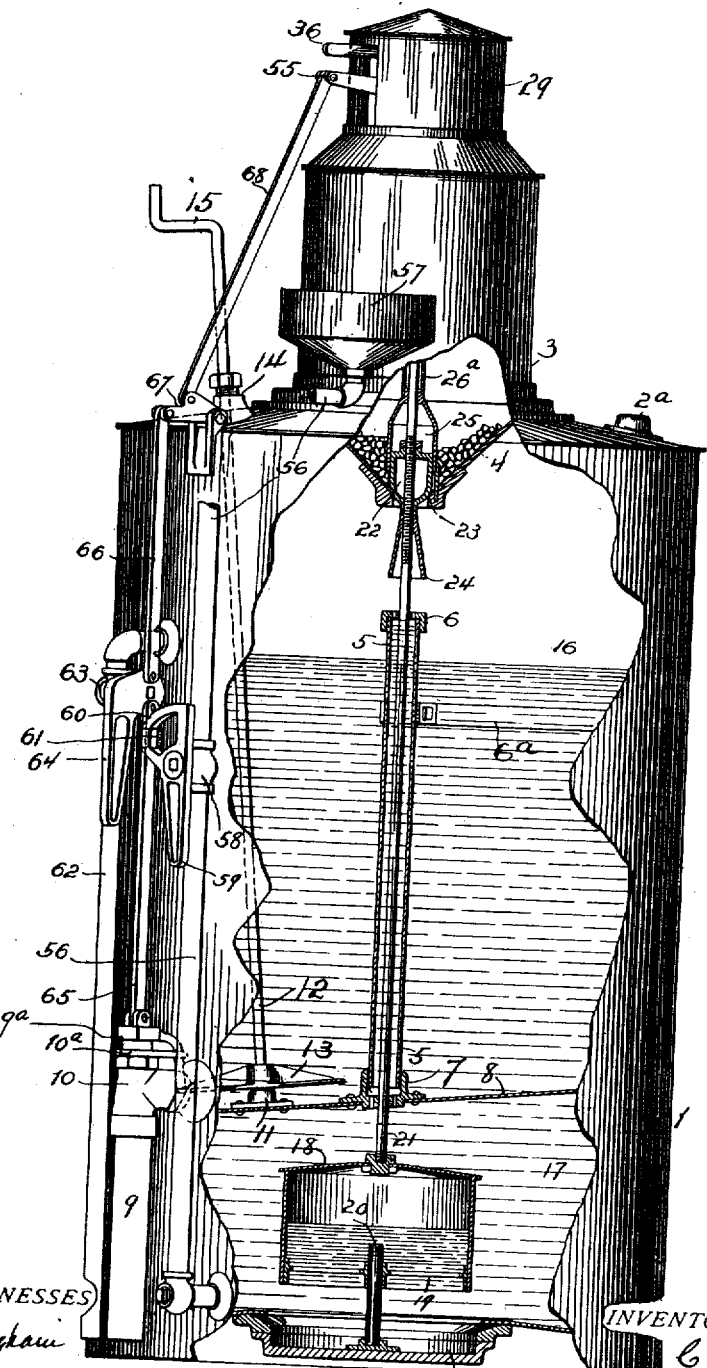

UNITED STATES PATENT OFFICE.

CECIL LIGHTFOOT, OF BUFFALO, NEW YORK.

MEANS FOR REGULATING RATE OF FLOW THROUGH A PASSAGE.

1,023,209.  Specification of Letters Patent.  Patented Apr. 16, 1912.

Application filed January 9, 1911. Serial No. 601,668.

*To all whom it may concern:*

Be it known that I, CECIL LIGHTFOOT, of Buffalo, in the county of Erie and State of New York, have invented certain new and useful Improvements in Means for Regulating Rate of Flow Through a Passage; and I do hereby declare the following to be a full, clear, and exact description of the invention, such as will enable others skilled in the art to which it appertains to make and use the same.

This invention relates to means for regulating the rate of flow through a passage, with the object of automatically maintaining a fluid pressure as nearly constant as possible, in which the regulator is automatically adjusted by an operating force which is brought into action and caused to automatically vary in intensity. The said force, newly harnessed as about to be described, causes the repeated readjustment of the regulator to suit changing conditions. The force is due to the buoyancy of a float immersed more or less completely in liquid, which float contains a quantity of gas whose volume varies inversely as the pressure to which it is subjected, thereby causing a less or greater displacement of liquid, by the float and its gaseous contents, in accordance with the greater or less pressure respectively to which the surface of the liquid is subjected.

The above described fluctuating buoyancy force may be employed in a manner to effect the required regulation of pressure, either by constricting a passage on an increase of pressure or, alternatively, an augmentation of pressure may effect a widening of the passage.

My invention may be applied to a variety of purposes among which may be mentioned the regulation of the pressure in gas mains, and for regulating the rate of feed of a solid substance which is divided into portions of dimensions sufficiently small to travel by gravity through the passage of regulated width.

My invention is particularly well adapted for the purpose of regulating the rate of generation of acetylene gas by the adjustment of the rate of feed of portions of calcium carbid to water, the manner whereby the invention is to be performed will be described and ascertained by reference to a construction of apparatus for such a purpose.

The invention may be embodied in various forms of construction as, for example; the gas contained within the float, which gas undergoes volumetric variation, may be confined within an inverted open-mounted receptacle into which the liquid enters to a varying degree according to the pressure in the gas generating chamber, the inverted receptacle being attached by a stem to a valve which is spring or weight-pressed with respect to a seat provided at the lower extremity of a downward converging receiver for calcium carbid. In the generation of acetylene gas it will be desirable for the float to be immersed in water which is separated from that into which the carbid of calcium drops.

With the end hereinbefore set forth in view, the invention consists in certain novel features and combinations of parts as hereinafter set forth and pointed out in the claims.

The accompanying drawing is a view, partly in elevation and partly in section of an acetylene gas generator, illustrating an embodiment of my invention.

1 represents a tank or cylinder provided in its bottom with an opening which is normally closed by a removable cover 2 and at its top, said tank is provided with a gas outlet 2ª. Upon the top of the tank, a carbid receptacle 3 is located, said receptacle being provided with a hopper or conical bottom 4 depending into the upper portion of said tank. Centrally within the tank, a vertical tube 5 is located and suitably supported by means of a bracket 6ª secured to the wall of the tank, said tube terminating at its upper end an appreciable distance below the outlet of the hopper 4, and terminating at its lower end a considerable distance above the bottom of the tank. The tube 5 is provided at its upper end with a perforated cap 6, and to the lower end of said tube a flanged member 7 having perforations, is secured. A partition plate 8 is secured to the flanged member 7 and disposed in an inclined position so as to cause spent carbid to gravitate to one side to the tank, from which it can be discharged through a flush pipe 9, the latter being provided with a valve 10. A bearing 11 is secured to the partition plate near the flush discharge, for the accommodation of the lower end of a shaft 12 to which an agitator 13 is secured for loosening-up the spent carbid. The shaft 12 extends upwardly through a suitable bearing 14 on the top of the tank 1 and is provided at its upper end with a suitable operating handle 15.

The partition plate 8 divides the tank into an upper chamber 16 and a lower chamber 17. A float 18 is located within the lower or float chamber and immersed in the fluid therein. This float is closed at its top and open at its bottom so that when it is immersed, liquid will enter the same and confine a body of gaseous fluid between its upper surface and the under surface of the top of said float. The lower portion of the float is provided with a spider 19 having a central opening through which a guide rod 20 passes, said rod extending upwardly from the bottom cover or door 2 of the tank. It is apparent that the float may be inserted into the float chamber through the bottom opening, which is normally closed by said cover or door 2.

The float 18 is secured to the lower end of a rod 21 which passes upwardly through the tube and through a valve 22 adapted to close on a seat 23 at the lower end of the hopper bottom 4 of the carbid receptacle 3. The valve 22 is secured to the rod 21 and at its lower end, carries a conical spreader 24 to prevent carbid from falling upon the perforated cap 6 on the tube 5. The valve 22 is partially inclosed by a fixed dome 25 supported by web 26 in the hopper 4, said dome serving to guide the valve and relieve it from pressure of carbid within the receptacle,—thus reducing resistance to the movements of the valve to a minimum and insuring its free and accurate operation. The dome 25 is made with a conical or contracted upper portion, from which a tube 26ª rises, and into this tube, the rod 21 enters.

A pipe 56 communicates at its lower end with the lower or float chamber 17 and at its upper end, said pipe is provided with a funnel 57 for the reception of water with which to supply the chambers 16 and 17 of the tank. At a point intermediate of its ends, the pipe 56 is provided with a valve 58, to the stem of which, a lever 59 is secured, and this lever is made with a segment 60 provided with a block 61.

Water supplied through the funnel 57 and pipe 56 will enter the float chamber 17, and when this chamber shall have become filled, the water will rise in the tube 5 and overflow into the chamber 16. In this manner, the chamber is supplied with a sufficient quantity of water. An overflow pipe 62 communicates with the chamber 16 of tank 1 at a point somewhat below the level of the top of the tube 5 and this overflow pipe is provided with a valve 63 which, during the normal operation of the apparatus, will be kept closed. A lever 64 is secured to the stem of the valve 63 and this lever is connected, by a rod 65 and an angular piece 9ª, with the valve 10 in the flush pipe 9, said angular piece serving, when in its lower position, to lock the flush valve against turning. It will be observed that the rod 65 is at right angles to a block 61 on the segment of valve lever 59 and that the latter cannot be operated to open the valve 58 in the water supply pipe, until the lever 64 has been operated to move the rod laterally out of alinement with the block 61 on lever segment 60. When the rod 65 is thus moved laterally, it will also be raised sufficiently to raise the angular piece 9ª and thus unlock the flush valve 10. After the flush valve has been thus unlocked, it can be turned to open it, by means of a lever 10ª and it can afterward be closed by means of the same lever while the angular piece 9ª is in raised position. The lever 64 of the overflow valve 63, is also connected, by means of a rod 66, with one arm of a bell-crank 67 pivotally supported at the top of the tank 1, the other arm of said bell-crank being connected, by means of a rod 68 with the lever 55 for operating devices (not shown) within the hopper cover 29.

As before stated, a certain quantity of gaseous fluid will be confined within the float or receptacle 18, the volume of which gaseous fluid undergoes a variation which is inversely proportional to the pressure of the gas generated in the chamber 16 of the tank 1. The buoyancy of the float being proportional to the weight of water displaced by the float and its gaseous contents, a force will be automatically available to lift the float and valve when the pressure in chamber 16 falls and permit more calcium carbid to drop into the water in chamber 16, to cause the generation of increased gas pressure, when the valve 22 will be caused to close. In other words, when the gas pressure in the chamber 16 decreases, the displacement of water within the float will be so decreased as to increase the buoyancy of the float and cause the valve 22 to be raised, and when the gas pressure in the chamber 16 increases, the buoyancy of the float will be decreased by the rise of water within the float.

Various changes might be made in the construction of the apparatus without departing from the spirit of my invention or limiting its scope and hence I do not wish to restrict myself to the precise details herein set forth.

Having fully described my invention what I claim as new and desire to secure by Letters-Patent, is:—

1. The combination with a pressure chamber to contain liquid and gas under pressure, and means for controlling the accumulation of gas in said chamber over the liquid therein, of a float having a chamber open at the bottom of the float and permanently closed at the top of the float, and means connecting the float with said gas controlling means, whereby the changes in pressure of gas on the surface of the liquid will vary the buoyancy of the float by displacement of the contents thereof and automatically operate said controlling means.

2. In regulating means of the character described, the combination with a pressure chamber, and controlling means, of a float having an opening in its lower portion and having its top permanently closed, said float adapted to be immersed in liquid subjected to pressure in the pressure chamber, whereby gaseous fluid is permanently confined within the float above the liquid therein, and means connecting the float with the controlling means, whereby said controlling will be substantially operated by the buoyancy of the float due to change of pressure in the pressure chamber and on the liquid in which the float is immersed.

3. In regulating means of the character described, the combination with a pressure chamber adapted to contain liquid, a superimposed chamber, and a valve in the bottom of said superimposed chamber, of a separate chamber adapted to contain liquid and communicating with the pressure chamber, a float wholly immersed in the liquid in said separate chamber, said float having a permanently open bottom and a permanently closed top and adapted to entrap expansive fluid, said float connected with said valve, whereby said valve will be operated by reason of varying pressure in the pressure chamber and on the liquid in which the float is immersed.

4. In regulating means of the character described, the combination with a pressure chamber adapted to contain liquid, a superimposed chamber, and a valve in the bottom of the superimposed chamber, of a separate chamber adapted to contain liquid and communicating with the pressure chamber so that the liquid in said separate chamber will be subjected to pressure from the pressure chamber, a float in said separate chamber and having a permanently open lower portion and a permanently closed top, and connections between said float and the valve in the bottom of the superimposed chamber.

5. In regulating means of the character described, the combination with a pressure chamber adapted to contain liquid, a superimposed receptacle communicating with the pressure chamber, and a valve for the superimposed receptacle, of a lower chamber below the pressure chamber and adapted to contain liquid, a tube communicating with the top of said lower chamber and open within the upper portion of the pressure chamber, a float having an open bottom disposed in the lower chamber so as to be immersed in the liquid therein, and a rod attached to said float and passing through said tube, said rod being attached to the valve of the superimposed receptacle.

In testimony whereof, I have signed this specification in the presence of two subscribing witnesses.

CECIL LIGHTFOOT.

Witnesses:
C. H. O. JENKINS,
HUBERT J. CREAN.

Copies of this patent may be obtained for five cents each, by addressing the "Commissioner of Patents, Washington, D. C."